United States Patent Office 3,465,111
Patented Sept. 2, 1969

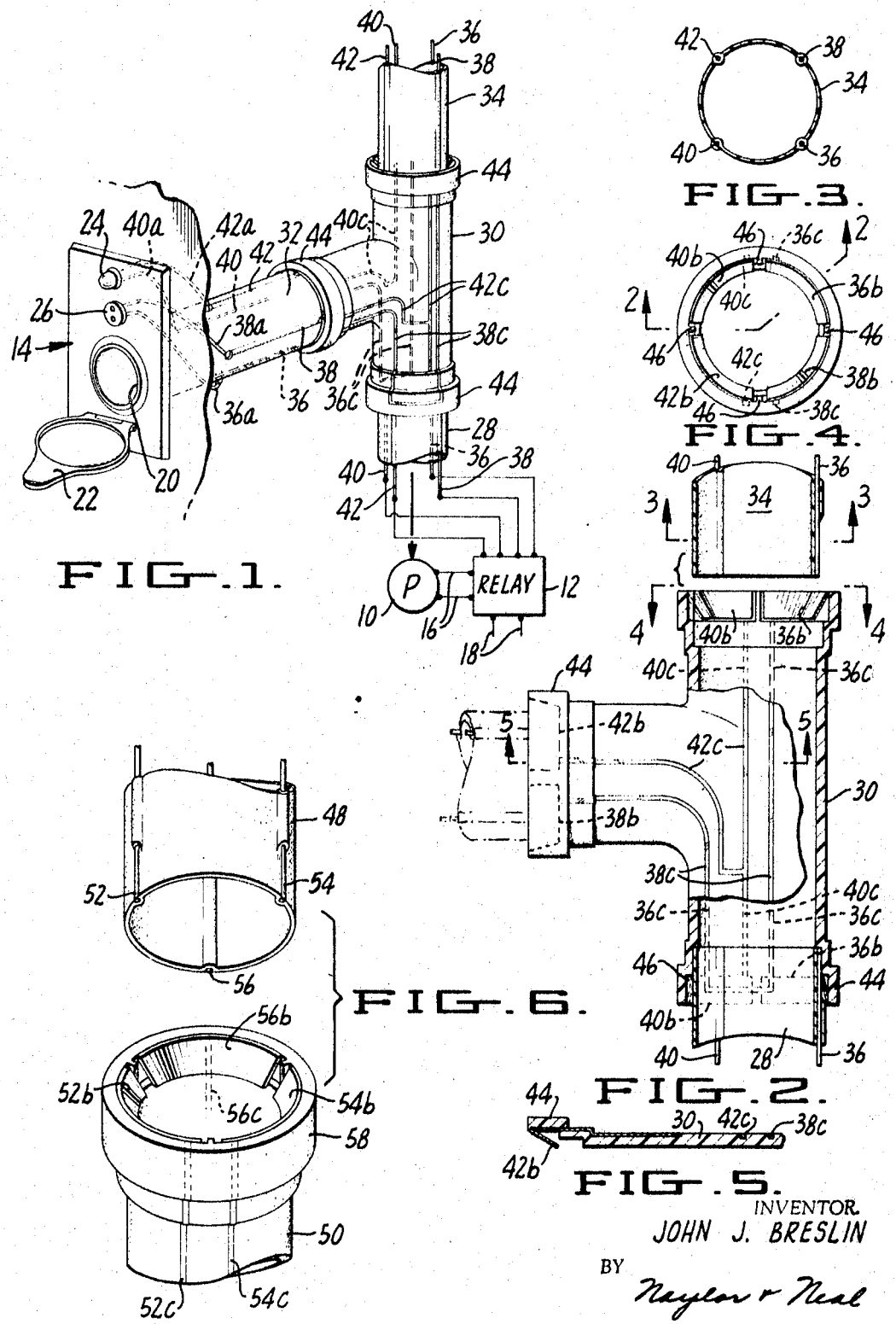

3,465,111
APPARATUS FOR ESTABLISHING A COMBINED FLUID CONDUIT AND ELECTRIC CIRCUIT SYSTEM
John J. Breslin, Los Altos Hills, Calif., assignor to Beamco, Inc., Mountain View, Calif., a corporation of California
Filed Jan. 19, 1967, Ser. No. 610,435
Int. Cl. H01h 3/16; H01b 7/00
U.S. Cl. 200—61.6       5 Claims

ABSTRACT OF THE DISCLOSURE

An apparatus for establishing an electrical circuit simultaneously with the establishment of a fluid conduit circuit. The apparatus incorporate electrical leads into fluid conduits and connecting fittings therefor in such a manner that assembly of the conduits and fittings simultaneously effects connection of the electrical leads.

---

The present invention relates to an apparatus for constructing prefabricated electrical circuits integrally with a fluid conduit system and is particularly designed for use in environments where it is necessary or advantageous to electrically start, stop or control a fluid for which the conduit system is intended. The invention is especially concerned with the apparatus ideally suited for providing fluid conduits and electrical control and monitoring circuits therefor for use in central vacuum cleaning systems.

In the prior art, it is common practice to provide fluid conduit systems and electrical circuitry therefor to effect control and/or monitoring of the systems at locations remote from their source. This arrangement is typical of that employed in central vacuum cleaning systems wherein a central vacuum unit has vacuum conduits and electrical circuitry leading therefore to various remote locations. In such arrangements, however, it is present practice to independently install the conduits and electrical circuitry. As a result, time, labor and material must be, similarly, independently consumed. Furthermore, independent paths for running of the conduits and electrical circuitry must, typically, be provided.

Certain prior art efforts have been made to combine fluid conduits and electrical circuitry. For example, it is common practice to incorporate electrical wires into the flexible fluid conduits used on cannister type vacuum cleaners in order to complete electrical circuits to the free or nozzle ends of the conduits. Such arrangements are also used on the flexible conduits leading from the wall inlets of central vacuum cleaning systems. An example of a conduit of the latter type may be found in my Patent No. 3,258,553.

The latter efforts have not made provision for the completion of electrical circuitry with permanently installed conduit systems wherein the systems are made up of multiple conduit sections joined by various fittings. Furthermore, these efforts have not provided for the completion of parallel electrical control circuits, as are typically required where a central vacuum cleaning unit is to be selectively controllable from a plurality of stations to which the conduits therefrom lead.

In summary, the present invention comprises an apparatus providing tubular elements and connecting fittings therefor through which assembly of a fluid conduit and electrical circuit system may be simultaneously effected. The fluid conduit elements and fittings of the invention are adapted to be coupled together to establish a fluid circuit therethrough and each incorporate electrical leads and contacts therefor. The contacts are disposed for connection simultaneously with the coupling of the tubular elements and fittings in the assembly of the fluid circuit.

It is, accordingly, a principal object of the present invention to provide an apparatus for establishing fluid conduit and associated electrical systems which avoid the shortcomings inherent with the prior art.

Another more specific object of the invention is to provide tubular conduit elements and connecting fittings therefor which incorporate mutually insulated electrical leads and contact elements adapted to establish connection of the leads simultaneously with assembly of the elements and fittings.

The foregoing and other objects and the specifics of the invention will become more apparent when viewed in light of the accompanying drawing, wherein:

FIG. 1 is a perspective view of a central vacuum cleaning system incorporating the present invention, with parts thereof broken away and parts shown schematically;

FIG. 2 is an elevational view, partially in section and partially exploded, illustrating the fitting of the invention incorporated into the system of FIG. 1;

FIGS. 3, 4 and 5 are sectional views taken on the planes designated, respectively, by lines 3—3, 4—4 and 5—5 of FIG. 2; and FIG. 6 is an exploded perspective view illustrating the mating ends of a conduit and fitting constructed according to the invention.

Referring now specifically to FIG. 1, therein is illustrated a central vacuum cleaning system comprising the following elements of conventional construction; a pump or vacuum unit 10; a relay 12 controllably associated with the pump 10; and an inlet fitting 14. Controllable association of the pump 10 and relay 12 is established by a pair of electrical leads 16 connected therebetween in conventional manner. Power is supplied to the system of FIG. 1 by primary electrical leads 18 connected to the relay 12 and extending therefrom to a source of current (not illustrated). The inlet fitting 14 comprises a vacuum mouth 20 opening there through; a hinged cover 22 to selectively close the mouth 20; a monitoring light 24; and, a two-lead control jack 26.

The system of FIG. 1 incorporates the apparatus of the present invention to establish fluid connection between the pump 10 and the mouth 20 and electrical circuitry between the relay 12 and the light 24 and jack 26. This apparatus comprises, as its basic elements: a conduit 28 secured in fluid communication with the pump 10 (as illustrated schematically by the arrow line); a T-shaped conduit fitting 30 secured at one end thereof in fluid communication with the conduit 28; a conduit 32 secured in fluid communication between a second end of the fitting 30 and the mouth 20; and, a conduit 34 secured in fluid communication with the third end of the fitting 30. Although not illustrated, it is to be understood that the conduit 34 may lead to one or more inlet fittings corresponding to the fitting 14. In the event there are a plurality of such fittings, connection thereto may be effected by interposing T-shaped conduit fittings corresponding to the fitting 30 in the conduit 34.

The conduits 28, 32 and 34 correspond identically in basic construction. These conduits may, however, differ in length and diameter to suit the particular environment in which they are used. In the embodiment illustrated in FIG. 1, each of these conduits is fabricated of a vinyl material, such as polyvinyl chloride, and has encapsulated therein in mutually spaced relationship a plurality of longitudinally extending electrical leads 36, 38, 40 and 42. For the sake of simplicity, the leads on each of these conduits which are connected together through the fitting 30 are designated by like numerals. Through their spacing by the material from which the conduits are fabricated, these leads are mutually insulated, as well as isolated.

It is to be understood that the fabrication of the conduits and the incorporation of the leads thereinto may be effected by any suitable technique, such as extrusion.

The fitting 30 is designed to establish therethrough two parallel electric circuits. In the example of FIG. 1, one of these circuits is connected to the leads 36 and 38 and the other is connected to the leads 40 and 42. The circuit connected to the leads 36 and 38 establishes connection between the relay 12 and the jack 26. It is through this circuit and the function of the relay 12 that the pump 10 is controlled. Connection between the circuit and the jack 26 is established by leads 36a and 38a extending between terminals on the leads 36 and 38, respectively, of the conduit 32 and the jack 26. The circuit connected to the leads 40 and 42 establishes connection between the relay 12 and the monitoring light 24. Connection to the monitoring light is effected by leads 40a and 42a connected between terminals on the leads 40 and 42, respectively, of the conduit 32 and the light 24. It is noted that the latter circuit functions in conventional manner through the relay 12 to illuminate the light 24 whenever the pump 10 is activated.

The fitting 30 comprises, in part, female socket couplings 44 formed on each of its ends. These couplings are each proportioned to snugly receive the ends of the conduits 28, 32 and 34 connected to the fitting. When received in the fitting 30, the ends of the conduits function as male probes to establish fluid communication between their interiors and the interior of the fitting 30. The latter relationship can best be seen from FIG. 2. The couplings 44 each have incorporated thereinto contacts 36b, 38b, 40b and 42b adapted, upon coupling of the conduits thereto, to establish electrical connection with the leads 36, 38, 40 and 42, respectively.

In the preferred embodiment illustrated, the fitting 30 is fabricated of an electrically nonconductive material, such as polyvinyl chloride, and the contacts 36b, 38b, 40b and 42b are integrally moulded thereinto as illustrated in FIG. 5. Although the latter figure only illustrates the contact 42b, it is to be understood that all of the contacts correspond in construction. Thus, it can be seen that each contact includes a leg extending inwardly of the coupling 44. It is this leg that establishes electrical connection between the contacts and the leads encapsulated into the conduits. This connection is established, as can be seen between the lowermost contact 36b and lead 36 in FIG. 2, by stripping the insulation off of the end of the lead received in the coupling. Although not illustrated, it is to be understood that the conduits and the fitting 30 may be provided with suitable indicia to code or key the contacts and the leads in the conduits together. For example, the conduits and the fitting may be provided with color codes above the respective leads and contacts therein. Furthermore, it is noted that the respective contacts are spaced apart, as indicated by the numeral 46, to avoid shorting therebetween. The spaces between the contacts are of a width greater than the diameter of the leads within the conduits. Thus, even if a conduit lead is inadvertently positioned between the contacts, shorting can not occur.

The parallel circuitry in the fitting 30 is established by leads electrically connecting the contacts in each of the couplings 44. For the sake of simplicity, these leads are designated by numerals corresponding to the contacts between which they extend, with the exception that they include the subscript c rather than b. These leads are as follows: 36c, 38c, 40c, and 42c. From FIGS. 1 and 2, it can be seen that these leads each essentially comprise a main conductor component extending between the upper and lower contacts to which they are connected and a branch conductor component extending from a main conductor component to the contacts on the center branch of the fitting 30.

In the preferred embodiment, the leads 36c to 42c are integrally incorporated into the outer surface of the fitting 30. This incorporation may be effected by any suitable technique. For example, techniques similar to those employed in the making of printed wiring circuits may be utilized. Since the voltages applied to the leads 36c to 42c are very low, it is generally unnecessary to insulate the outer surfaces of these leads. Where such insulation is desired, however, the leads may be encapsulated by conventional techniques.

FIG. 6 illustrates the mating ends of a conduit 48 and fitting 50 corresponding in construction to the mating ends on the conduits 28, 32 and 34 and the fitting 30, with the exception that they are designed to incorporate a three wire circuit rather than a four wire circuit. The electrical leads of the conduit 48 are designated by the numerals 52, 54 and 56. The socket coupling of the fitting 50 is designated by the numeral 58 and the contacts therein adapted to establish electrical connection with the leads 52, 54 and 56 are designated by the numerals 52b, 54b and 56b, respectively. The leads in the fitting 50 connected to the contacts 52b, 54b and 56b are designated by numerals 52c, 54c and 56c, respectively.

In order to assemble the aforedescribed conduits and fittings, it is merely necessary to strip the insulation from the ends of the leads in the conduits and insert the conduit ends into the female coupling sockets on the fittings. Once the conduits and fittings are so assembled, a combined fluid and electrical circuit system may be established simply by connecting the free ends of the conduits and the leads therein to any desired fixture and/or installation to be used in combination therewith, such as the vacuum inlet fixture 14 and pump installation 10 illustrated in FIG. 1. Although not illustrated, it is to be understood that the fixtures and/or installations to be used in combination with the inventive conduits might be provided with plug-in type couplings having main contacts incorporated thereinto corresponding to the coupling 44. In this event, it would not be necessary to run separate leads, such as the leads 36a to 42a, between the conduit ends and the fixture or installation to be connected thereto.

Assembly of a combined fluid conduit and electrical circuit system may also be effected with the present invention by fabricating the conduits and fittings of a solvent dissoluble material, such as polyvinyl chloride, so that the conduits and fittings may be welded together by the application of a solvent thereto. When a conduit and fitting constructed according to the foregoing description and accompanying drawing are fabricated of such a material, assembly may be effected simply by applying a solvent to the end portion of a conduit and then forcing this portion into the coupling of a fitting. In this operation, the application of the solvent to the outer surface of the conduit end portion functions to soften the material encapsulating the electrical leads in the end portion. Thus, when the end portion is forced into the coupling of the conduit, the contacts function to strip the material from the electrical leads in the end portions and to establish electrical contact with these leads. Simultaneously with the establishment of this contact, the mating surfaces of the conduit end portion and the fitting are welded together by the solvent.

From the foregoing description, it is believed apparent that the present invention enables the accomplishment of the objects initially set forth herein. The description is, however, merely intended to be explanatory of the invention. Various changes in the details of the illustrated invention may be made, within the scope of the appended claims, without departing from the spirit of the invention.

What is claimed is:

1. A combined fluid conduit and electrical circuit system comprising:
(a) a tubular conduit element having a plurality of mutually insulated electrically conductive leads integrally secured thereto and extending longitudinally thereof, said leads terminating, respectively, in mutually insulated electrically conductive contact portions at one end of said conduit element;

(b) a tubular fitting element having a plurality of mutually insulated independent electrically conductive leads integrally secured thereto, said leads terminating, respectively, in mutually insulated electrically conductive contact portions at one end of said fitting therefor;

(c) a female socket formed on the end of one of said elements as a contiguous extension of the interior peripheral surface thereof;

(d) a male probe formed on the end of the other of said elements as a contiguous extension of the exterior peripheral surface thereof; and wherein:

(1) the contact portions of the element having the female socket formed thereon each comprise a segment of elongate arcuate shape disposed on and extending annularly over a section of the interior of said socket;

(2) the contact portions of the element having the male probe formed thereon are disposed on the exterior of said probe and each comprise a stripped section of one of the leads secured to the element; and (3) said probe and socket are peripherally engageable to simultaneously establish sealed interior fluid communication between said elements and mutually insulated electrical connections between the respective contact portions of one of said elements and the respective contact portions of the other of said elements.

2. A combined fluid conduit and electrical circuit system, comprising:

(a) a tubular conduit element having a plurality of mutually insulated electrically conductive leads extending generally longitudinally thereof and integrally secured thereto for fixed support thereon, said element having an open terminal end and said leads being laterally exposed adjacent said end to provide contact portions integrally secured to said conduit element for fixed support thereon; and, (b) a tubular fitting element having an open terminal end matable with the open terminal end of the conduit element to establish sealed interior fluid communication between said elements, said fitting element having a plurality of mutually insulated electrical contact portions supported thereon adjacent the open terminal end thereof and disposed, respectively, for contact with the respective laterally exposed contact portions of the leads in the tubular conduit element upon mating of the terminal ends of said elements; and wherein:

(1) a female socket is formed on the open terminal end of one of said elements as a contiguous extension of the interior peripheral surface thereof;

(2) a male probe is formed on the open terminal end of the other of said elements as a contiguous extension of the exterior peripheral surface thereof;

(3) the contact portions of said elements are disposed and exposed, respectively, interiorly of said socket and exteriorly of said probe; and, (4) upon mating of said ends, said probe telescopes into said socket.

3. A system according to claim 2, wherein:
(a) said conduit element is formed of an electrically nonconductive material; and,
(b) the leads secured to said conduit are disposed in spaced relationship relative to each other whereby said material functions to mutually insulate said leads.

4. A system according to claim 2, wherein:
(a) said fitting element is formed of an electrically nonconductive material; and,
(b) the contact elements of said fitting are disposed in spaced relationship relative to each other whereby said material functions to mutually insulate and said leads.

5. A combined fluid conduit and electrical circuit system, comprising:
(a) a tubular conduit element having a plurality of mutually insulated electrically conductive leads extending generally longitudinally thereof and integrally secured thereto for fixed support thereon, said element having an open terminal end and said leads being laterally exposed adjacent said end to provide contact portions integrally secured to said conduit element for fixed support thereon; and, (b) a tubular fitting element having an open terminal end matable with the open terminal end of the conduit element to establish sealed interior fluid communication between said elements, said fitting element having a plurality of mutually insulaled electrical contact portions adjacent the open terminal end thereof disposed, respectively, for contact with the respective laterally exposed contact portions of the leads in the tubular conduit element upon mating of the terminal ends of said elements; and wherein:

(1) a female socket is formed on the open terminal end of one of said elements as a contiguous extension of the interior peripheral surface thereof;

(2) a male probe is formed on the open terminal end of the other of said elements as a contiguous extension of the exterior peripheral surface thereof;

(3) the contact portions of the element having the socket formed thereon are disposed on the interior of said socket and each comprises a segment of elongated arcuate shape extending annularly over a section of the surface of said interior;

(4) the contact portions of the element having the probe formed thereon are disposed on the exterior of said probe; and (5) upon mating of said ends, said probe telescopes into said socket.

References Cited
UNITED STATES PATENTS 3,314,039   4/1967   Opper _____ 174—47 X
3,387,319   5/1968   Ferraris et al. _____ 200—61.6

ROBERT K. SCHAEFER, Primary Examiner

ROBERT A. VANDERHYE, Assistant Examiner

U.S. Cl. X.R.

174—47; 339—16